(12) United States Patent
Fluegge et al.

(10) Patent No.: US 8,652,972 B2
(45) Date of Patent: Feb. 18, 2014

(54) STABILIZED ETCHING SOLUTIONS FOR CU AND CU/NI LAYERS

(75) Inventors: Martin Fluegge, Wiesbaden (DE); Raimund Mellies, Dieburg (DE); Thomas Goelzenleuchter, Buettelborn (DE); Marianne Schwager, Weiterstadt (DE); Ruediger Oesten, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1714 days.

(21) Appl. No.: 12/063,033

(22) PCT Filed: Aug. 7, 2006

(86) PCT No.: PCT/EP2006/065104
§ 371 (c)(1),
(2), (4) Date: Feb. 6, 2008

(87) PCT Pub. No.: WO2007/020206
PCT Pub. Date: Feb. 22, 2007

(65) Prior Publication Data
US 2010/0304573 A1    Dec. 2, 2010

(30) Foreign Application Priority Data
Aug. 12, 2005   (DE) .......................... 10 2005 038 414

(51) Int. Cl.
*C09K 13/06* (2006.01)
*H01L 21/302* (2006.01)
*H01L 21/461* (2006.01)

(52) U.S. Cl.
USPC .......................................... 438/754; 252/79.4

(58) Field of Classification Search
USPC ................... 252/79.4; 438/754; 257/E21.485
See application file for complete search history.

(56) References Cited

U.S. PATENT DOCUMENTS

| 3,341,384 A * | 9/1967 | Jones et al. .................... 216/106 |
| 2001/0052510 A1 * | 12/2001 | Schemenaur et al. ........ 216/100 |

FOREIGN PATENT DOCUMENTS

| DE | 2405214 | 8/1974 |
| EP | 0 426 949 | 5/1991 |
| JP | 48 103043 | 12/1973 |
| JP | 50 140333 | 11/1975 |
| JP | 57 89481 | 6/1982 |
| JP | 7 235752 | 9/1995 |
| JP | 8 311663 | 11/1996 |
| JP | 2004 43895 | 2/2004 |
| SU | 929738 | 5/1982 |
| SU | 950799 | 9/1982 |

* cited by examiner

*Primary Examiner* — Nadine Norton
*Assistant Examiner* — Mahmoud Dahimene
(74) *Attorney, Agent, or Firm* — Oblon, Spivak, McClelland, Maier & Neustadt, L.L.P.

(57) ABSTRACT

The present invention relates to new storage-stable solutions which can be used in semiconductor technology to effect specific etching of copper metallization layers and also Cu/Ni layers. With the new etch solutions it is possible to carry out etching and patterning of all-copper metallizations, layers of copper/nickel alloys, and also successive copper and nickel layers.

5 Claims, No Drawings

STABILIZED ETCHING SOLUTIONS FOR CU AND CU/NI LAYERS

The present invention relates to new storage-stable solutions which can be used in semiconductor technology to effect specific etching of copper metallization layers and also Cu/Ni layers. With the new etch solutions it is possible to carry out etching and patterning of all-copper metallizations, layers of copper/nickel alloys, and also successive copper and nickel layers.

From the journal and patent literature, etchants per se for microstructure etching for Cu and Ni metallizations have been known for more than 20 years. In particular, etching mixtures composed of $HNO_3$ and $H_2O_2$ as such are known for this purpose (JP 48103043 or JP 57089481). Patent SU 950799 describes the etching of V—Ni—Cu multilayer with $HNO_3/H_2O_2$ mixtures and various auxiliaries. For the etching of thin copper layers it is also possible to add other acids and auxiliaries to the mixtures of $HNO_3$ and $H_2O_2$ (JP 50140333 from 1974 or SU 929738).

For stabilizing acidic etching mixtures containing $H_2O_2$, and for preventing the decomposition of the $H_2O_2$ by Fe ions, DE 2405214 A discloses the addition of EDTMPA (Dequest® 2041).

At the present time various multilayers are being increasingly used in semiconductor technology, comprising Cu or layers composed only of copper.

Being used in particular are multilayers composed of Cu and Ni layers which are closed off at the top by a noble metal layer (Au) for external contacts and at the bottom by a Ti or TiW layer.

Typically these layers are etched individually using separate etch solutions. Consequently a relatively large number of operating steps, in accordance with the layer structure, is needed for patterning. At the same time the number of operating steps increases the requirements in terms of process accuracy, since possible residual layers can have extremely disruptive consequences for the subsequent operating step.

Layer sequences of Cu and Ni in particular have to date typically been etched in separate steps using different etch solutions.

Thus, for example, a copper layer can be etched by means of an $H_2O_2/NH_4OH$ solution, whereas a nickel layer can be etched by means of an acidic ammonium peroxodisulfate solution.

A solution of $HNO_3/H_2O_2$ can be used to etch a layer sequence of Cu and Ni in a single workstep. When corresponding solutions are used for the etching of Cu layers and Ni layers, however, etch rates decrease sharply in the course of etching. The reason for this lies in the fact that the ingress of Cu and/or Ni ions into the solution results in catalytic decomposition of the hydrogen peroxide in the solution.

As a result there is a change in the composition of the etch solution after the first etch attack on Cu-containing metallizations, irrespective of whether further Cu ingress occurs or not. After the $H_2O_2$ in the etched solution has been consumed, the etch rates for Cu and Ni alter dramatically. This means that the use of unstabilized etch solutions based on $HNO_3/H_2O_2$ mixtures for etching Cu and Ni layers is of only limited possibility and that stable etch rates would be attainable only with a relatively high degree of technological cost and inconvenience.

It is an object of the present invention, therefore, to provide inexpensive stabilized etch solutions which allow not only successive copper and nickel layers but also Cu—Ni alloy metallizations to be etched simply and with a constant etch rate. In particular it is an object of the present invention to provide an etch solution which allows sequences of Cu and Ni layers to be etched in a single workstep. Especially it is an object of the present invention to provide improved etch solutions in which the catalytic decomposition of the $H_2O_2$ is reduced and for which, during the etching operation, copper ions and, if appropriate, nickel ions which accumulate in the solution do not adversely affect the quality of the etched semiconductor products.

The present object is achieved by means of new, stabilized etch solutions for etching copper layers and nickel layers, or layers of corresponding alloys, comprising nitric acid ($HNO_3$), hydrogen peroxide ($H_2O_2$), citric acid, and water, and in particular by means of etch solutions which comprise nitric acid in an amount of 5% to 50% by weight, based on the overall composition, and hydrogen peroxide in an amount of 1% to 10% by weight, based on the overall composition. These solutions may comprise citric acid in an amount of 0.5% to 10% by weight, based on the overall composition. Particularly good etch outcomes are found with solutions of this kind which comprise nitric acid ($HNO_3$) in an amount of 15% to 35% by weight, based on the overall composition, hydrogen peroxide ($H_2O_2$) in an amount of 2% to 6% by weight, based on the overall composition, and citric acid in an amount of 2.5% to 6.5% by weight, based on the overall composition. In accordance with the invention the new etch solutions may further comprise additional substances, specifically those which enhance the properties of the solutions during the implementation of the etch operation and lead consequently to improved product qualities. Such additions may be additives, such as wetting agents or surfactants.

In accordance with the invention these etch solutions can be used in semiconductor technology.

The invention likewise provides a process for etching successive copper layers and nickel layers in semiconductor technology, which involves immersing semiconductor elements having corresponding layers in an etch solution as described above for a sufficiently long time and, after the metal layers have been etched away in a single step, removing the semiconductor elements from the etch solution, washing them with water, and drying them.

In the past there has been no lack of attempts to stabilize the active $H_2O_2$ in $HNO_3/H_2O_2$-containing mixtures in order to maintain a consistent etch rate when using such solutions. To date, however, no addition has been found that prevents the catalytic decomposition of hydrogen peroxide and at the same time does not adversely affect the properties of the etch solution. Critical to the choice of a suitable stabilizing addition is that adding it to the solutions used must not cause any impairment to the other layers of the semiconductor element which is treated under typical operating conditions.

Surprisingly it has now been found that the addition of citric acid to $HNO_3/H_2O_2$-containing etch solutions allows the decomposition of hydrogen peroxide in the presence of copper ions to be largely prevented. Even if such copper and nickel ions do accumulate in the etch solution, the etching operation still proceeds at a high speed. Even at a level of such metal ions in the solution of about 5% by weight in total, the etching operation still takes place with a virtually unchanged speed as compared with the etch rate using fresh etch solution still free from contaminating metal ions. Furthermore, the inhibiting effect on the decomposition of $H_2O_2$ induced by copper and/or nickel ions is retained even at relatively high temperatures. It is therefore possible with these new etch solutions to operate both at low temperatures and at elevated temperatures up to 90° C. with almost constant etch rates.

The concentration of the added citric acid can be situated in the range of 0.5%-10% by weight, based on the overall composition, the range from 2.5% to 6.5% by weight being preferred.

Suitable solutions for etching all-copper or all-nickel layer metallizations or corresponding alloy metallizations may comprise 5% to 50% by weight of $HNO_3$, based on the overall composition. It is preferred to use etch solutions in which the concentration is in the range from 15% to 35% by weight. In these solutions the amount of $H_2O_2$ can be in the range from 1% to 10% by weight, based on the overall composition. Particular preference is given to compositions having an $H_2O_2$ content in the range between 2% to 6% by weight.

The etch solutions of the invention can be produced using highly purified nitric acid with a concentration of 69.5% by weight in a grade of the kind commonly used in semiconductor technology. The active etchant, the hydrogen peroxide, can be used in the form of a high-purity aqueous solution. This solution may be unstabilized if it has been freshly prepared. Alternatively it may be stabilized, by means of suitable amounts of dipicolinic acid or EDTMPA, for example. It is preferred to use $H_2O_2$ as a purified, 31% strength by weight, commercially customary, aqueous solution stabilized with dipicolinic acid. The etch solutions are appropriately diluted by adding corresponding amounts of highly purified water in a grade suitable for use in semiconductor technology.

The etch solutions can be prepared by adding a weighed amount of citric acid to a suitable amount of undiluted hydrogen peroxide solution, which may have been stabilized. The hydrogen peroxide solution containing citric acid that is obtained in this way can then be mixed appropriately, with cooling if appropriate, with a measured amount of concentrated nitric acid, and diluted with highly purified water.

It has proven sensible to dissolve the citric acid in the diluent water beforehand and to add that solution to the mixture prepared from nitric acid in hydrogen peroxide solution.

In industrial application the first variant has proven the more suitable.

In the manner described, aqueous etch solutions are obtained which, besides nitric acid, hydrogen peroxide, and water, comprise citric acid as stabilizer for the hydrogen peroxide present and also comprise, if appropriate, in small amounts, one or more stabilizers that were present in the concentrated hydrogen peroxide solution. As already described above, the latter compounds may be compounds such as dipicolinic acid, EDTMPA or else other stabilizers customarily employed commercially.

Without further additions, these solutions are particularly suitable for etching copper layers and nickel layers or corresponding alloy layers in semiconductor technology, and are able to exhibit a virtually unchanged etch rate over a relatively long time in the etching operation.

If necessary it is also possible, for the purpose of improving the etching operation, to add small amounts of additives suitable for semiconductor technology to these solutions of the invention, such as wetting agents, surfactants, etc. Additives of this kind serve to improve the wettability of the metallic surfaces and are able thus to contribute to improving the etching operation. In the investigations carried out it was found, however, that such additives are not absolutely necessary, since excellent etching outcomes at high etch rates are obtained generally without further additions.

As has already been referred to above, the etch solutions of the invention are of virtually unchanged activity and sufficient stability without problems even at elevated temperatures. They can be employed up to a temperature of about 90° C. Particularly good results are achieved for the use of the solutions in the temperature range from about 10 to 40° C. The etch steps to be carried out in semiconductor technology can therefore take place preferentially at room temperature.

The new etch solutions described are used in a conventional way to etch Cu—Ni layers in semiconductor technology. The wafers to be treated, carrying copper, nickel or copper/nickel layers to be etched, are immersed in a bath containing etch solution, as described above, at an appropriate temperature. Depending on the thickness of the metal layer to be etched, the etching operation is ended, after a duration of from 20 seconds up to several minutes, by removal of the wafer from the etch solution and its rinsing with high-purity water. The rinsing operation may take place a number of times. Thereafter the wafers are conventionally dried.

The new compositions of the etch solutions of the invention have the advantage that it is possible to operate with a high etch rate over the entire duration of the operating step and that the etch solution can be used for longer. At the same time it has emerged that, as a result of the shortened etch duration, it is possible almost completely to avoid deleterious effects of the etch solution on the remaining structure of the wafer. This is particularly true in respect of the "lift-off" effects which otherwise occur and in respect of unwanted redeposition of metal ions on the wafer surface. In this context it has emerged that the addition of citric acid prevents the catalytic decomposition of the hydrogen peroxide by Cu and/or Ni ions as well as the contamination of the surfaces by etching products. In this context it is also emerged that the etching operation involving exposure to the compositions of the invention apparently proceeds in accordance with a different mechanism than when using the etch solutions employed hitherto for these metallization layers. The dissolution of the metallization layers apparently takes place not by the simple dissolutive removal of metal particles but also, apparently, by a dissolutive break-up of the bare metal layers. Accordingly, after the etching operation has been carried out, it is virtually impossible to find any particles in the etch solution. This has the particular advantage that there are also no quality detractions as a result of unwanted settling of particles on the wafer surfaces.

Moreover, by virtue of the short reaction times, possible etch attack on the exposed layers and other areas of the wafer is reduced to a minimum.

Since the etch solutions of the invention are capable of etching both copper layers and nickel layers it is readily possible to use these solutions to etch successive copper layers and nickel layers in a single operating step, so that the existing two-stage etching operation using different etch solutions for copper and for nickel can be replaced by a single operating step and it is now necessary to use only one etch solution. In this way the use of the etch solutions of the invention results in considerable savings in terms of material, time, and costs.

Furthermore, the one-stage etching step for successive copper layers and nickel layers makes it possible to avoid problems which resulted hitherto from remnant residual layers of copper and nickel.

Therefore, through the use of the etch solutions of the invention, it is possible to achieve high-quality etch outcomes which hitherto were obtainable comparably only with substantially greater complexity and at higher cost.

The invention claimed is:

1. A stabilized etch solution for etching copper layers and nickel layers, or layers of corresponding alloys, comprising, based on the stabilized etch solution, nitric acid ($HNO_3$), in an amount of 5% to 50% by weight, hydrogen peroxide in an amount of 1% to 10% by weight, citric acid in an amount of 2.5% to 10% by weight, and water.

2. The etch solution according to claim 1, comprising nitric acid ($HNO_3$) in an amount of 15% to 35% by weight, hydrogen peroxide ($H_2O_2$) in an amount of 2% to 6% by weight, and citric acid in an amount of 2.5% to 6.5% by weight.

3. The etch solution according to claim 1, comprising additives selected from the group consisting of wetting agents and/or surfactants.

4. A process for etching successive copper or copper alloy layers and nickel or nickel alloy layers, which comprises immersing semiconductor elements having corresponding successive layers in an etch solution for a sufficient time to etch the metal layers away in a single step and, after the metal layers have been etched away in a single step, removing the semiconductor elements from the etch solution, washing them with water, and drying them,
    wherein the etch solution comprises, based on the etch solution, nitric acid ($HNO_3$), in an amount of 5% to 50% by weight, hydrogen peroxide in an amount of 1% to 10% by weight, citric acid in an amount of 2.5% to 6.5% by weight, and water.

5. The process according to claim 4, wherein the etch solution comprises at least one additive selected from the group consisting of wetting agents and surfactants.

* * * * *